United States Patent
Schmitz et al.

(10) Patent No.: US 6,794,048 B2
(45) Date of Patent: Sep. 21, 2004

(54) MULTILAYER COMPOSITE BASED ON POLYAMIDE/POLYOLEFIN

(75) Inventors: Guido Schmitz, Duelmen (DE); Harald Haeger, Recklinghausen (DE)

(73) Assignee: Degussa AG, Duesseldorf (DE)

( * ) Notice: Subject to any disclaimer, the term of this patent is extended or adjusted under 35 U.S.C. 154(b) by 42 days.

(21) Appl. No.: 10/025,547

(22) Filed: Dec. 26, 2001

(65) Prior Publication Data

US 2002/0082352 A1 Jun. 27, 2002

(30) Foreign Application Priority Data

Dec. 23, 2000 (DE) .......................... 100 65 177

(51) Int. Cl.$^7$ .......................... B32B 27/32; B32B 27/34
(52) U.S. Cl. .............................. 428/474.7; 428/474.9; 428/476.9; 428/36.91; 525/180; 525/184
(58) Field of Search ............... 428/474.7, 474.9, 428/476.9, 36.91; 525/180, 184

(56) References Cited

U.S. PATENT DOCUMENTS

| | | | |
|---|---|---|---|
| 3,561,493 A | | 2/1971 | Maillard et al. |
| 3,676,400 A | * | 7/1972 | Kohan et al. ............... 524/343 |
| 5,792,532 A | * | 8/1998 | Pfleger ...................... 428/36.9 |
| 5,850,855 A | | 12/1998 | Kerschbaumer et al. |
| 5,858,492 A | | 1/1999 | Roeber et al. |
| 5,869,190 A | | 2/1999 | Stoeppelmann |
| 5,962,146 A | * | 10/1999 | Betremieux et al. ...... 428/476.9 |
| 6,131,618 A | | 10/2000 | Brundy et al. |
| 6,161,879 A | | 12/2000 | Ries et al. |
| 6,335,101 B1 | | 1/2002 | Haeger et al. |
| 6,355,358 B1 | | 3/2002 | Boer et al. |
| 6,386,240 B1 | | 5/2002 | Roeber et al. |
| 6,435,217 B1 | * | 8/2002 | Bertero et al. .............. 138/126 |
| 6,528,137 B2 | | 3/2003 | Franosch et al. |
| 6,538,073 B1 | * | 3/2003 | Oenbrink et al. ........... 525/420 |
| 6,579,581 B2 | * | 6/2003 | Bartz et al. ................ 428/34.7 |
| 2001/0018105 A1 | * | 8/2001 | Schmitz et al. .......... 428/36.91 |
| 2001/0050478 A1 | * | 12/2001 | Schmitz ..................... 285/21.1 |
| 2002/0115771 A1 | * | 8/2002 | Schueler et al. ............ 524/394 |
| 2002/0119267 A1 | * | 8/2002 | Himmelmann et al. ..... 428/35.7 |
| 2002/0119272 A1 | * | 8/2002 | Ries et al. ................ 428/36.91 |
| 2002/0142118 A1 | * | 10/2002 | Schmitz et al. ............ 428/35.7 |
| 2003/0072987 A1 | * | 4/2003 | Ries et al. ..................... 429/34 |

FOREIGN PATENT DOCUMENTS

| | | | |
|---|---|---|---|
| CA | 2351152 | 12/2001 | |
| DE | 37 15251 A1 | 12/1988 | |
| DE | 40 00 434 C1 | 4/1991 | |
| EP | 0 435 787 | 7/1991 | |
| EP | 1 031 411 | 8/2000 | |
| EP | 1 065 048 | 1/2001 | |
| GB | 2 204 376 A | 11/1988 | |
| JP | 06-122182 | * 5/1994 | ........... B32B/27/32 |
| WO | WO 99/43496 | * 9/1999 | ........... B32B/27/08 |

OTHER PUBLICATIONS

Derwent Search Report for U.S. 6,579,581.

* cited by examiner

Primary Examiner—James J. Seidleck
Assistant Examiner—Melanie Bissett
(74) Attorney, Agent, or Firm—Oblon, Spivak, McClelland, Maier & Neustadt, P.C.

(57) ABSTRACT

A multilayer composite comprising the following layers bound directly to one another:

I. a layer I of a polyamide molding composition;
II. a layer II of a bonding agent comprising at least 50% by weight of a mixture of
   a) from 30 to 70 parts by volume of polyamide and
   b) from 70 to 30 parts by volume of polyolefin, where the sum of the parts by volume is 100 and in addition at least some of the polyamide is present either in the form of a polyamide-polyolefin graft copolymer or as a highly branched polyamine-polyamide copolymer;
III. if desired a layer III of a polyolefin molding composition, displays good adhesion between layers which remains largely intact even on prolonged contact with alcohol-containing or aqueous media at elevated temperature.

20 Claims, No Drawings

MULTILAYER COMPOSITE BASED ON POLYAMIDE/POLYOLEFIN

The invention relates to a multilayer composite in which a polyamide layer and a polyolefin layer are joined to one another by means of a specific bonding agent.

Multilayer composites comprising a polyamide layer and a polyolefin layer are known per se. Thus, DE-A 37 15 251 describes a two-layer tube consisting of a polyamide layer and a polyolefin layer for conveying an alcoholic medium. To achieve any adhesion at all between the layers, the polyolefin contains groups derived from maleic acid.

DE-C 40 00 434 describes a multilayer coolant line which, in one embodiment, comprises an outer polyamide layer, an inner polyolefin layer and an intermediate bonding layer of a polyolefin bearing functional groups.

Such composites have firm adhesion between the layers after their production. However, it has been found that adhesion between the layers of functionalized polyolefin and polyamide becomes lower and lower on prolonged contact with aqueous liquids or alcohol-containing fuel, particularly at elevated temperatures, and finally drops to values which are no longer acceptable in practice; the reasons for this are considered to be alcoholysis or hydrolysis reactions.

A different concept is presented in U.S. Pat. No. 3,561,493. There, a mixture of polyamide and polyethylene is recommended as bonding agent between a polyamide layer and a polyolefin layer. However, attempts to reproduce this disclosure show that, depending on which polymer forms the coherent phase in the mixture, only adhesion either to the polyamide layer or to the polyethylene layer is obtained, but never both at the same time.

Finally, EP Application No. 00 10 9633.8 (intended Publication Number 1 065 048), which is not a prior publication, describes a multilayer composite comprising a bonding agent which comprises a polyamine-polyamide copolymer. A polyolefin layer or the presence of a polyolefin in the bonding agent is not disclosed there.

It is an object of the present invention to produce a multilayer composite comprising a polyamide layer and a polyolefin layer joined by means of a bonding layer which does not consist of a functionalized polyolefin. A further object is to produce such a multilayer composite in which the adhesion between layers remains largely intact even on prolonged contact with alcohol-containing or aqueous media at elevated temperatures. A further object is to firmly join a polyamide layer and a layer which has the features of a polyolefin molding composition and therefore may make an additional polyolefin layer unnecessary.

These objects are achieved by a multilayer composite which comprises the following layers bound directly to one another:

I. a layer I of a polyamide molding composition;
II. a layer II of a bonding agent comprising at least 50% by weight, preferably at least 70% by weight and particularly preferably at least 85% by weight, of a mixture of
 a) from 30 to 70 parts by volume of polyamide, preferably from 40 to 60 parts by volume, and
 b) from 70 to 30 parts by volume of polyolefin, preferably from 60 to 40 parts by volume, where the sum of the parts by volume is 100 and in addition at least some of the polyamide is present either in the form of a polyamide-polyolefin graft copolymer or as a highly branched polyamine-polyamide copolymer;
III. if desired a layer III of a polyolefin molding composition.

Possible polyamides for the layer I or the bonding agent are first and foremost aliphatic homopolycondesates and copolycondesates, for example PA 46, PA 66, PA 68, PA 612, PA 88, PA 810, PA 1010, PA 1012, PA 1212, PA 6, PA 7, PA 8, PA 9, PA 10, PA 11 and PA 12. (The designation of the polyamides corresponds to the international standard, where the first digit(s) indicates the number of carbon atoms in the starting diamine and the last digit (s) indicates the number of carbon atoms of the dicarboxylic acid. If only one number is given, this means that the polyamide has been prepared from an α, ω-aminocarboxylic acid or from the lactam derived therefrom; for further information, reference may be made to H. Domininghaus, Die Kunstatoffe und ihre Eigenschaften, pages 272 ff., VDI-Verlag, 1976.)

If copolyamides are used, they can comprise, for example, adipic acid, sebacic acid, suberic acid, isophthalic acid, terephthalic acid, naphthalene-2,6-dicarboxylic acid, etc., as coacid and bis(4-aminocyclohexyl)methane, trimethylhexamethylenediamine, hexamethylenediamine or the like as codiamine. Lactams such as caprolactam or laurolactam or aminocarboxylic acids such as ω-aminoundecanoic acid can likewise be incorporated as cocomponents.

The preparation of these polyamides is known (e.g. D. B. Jacobs, J. Zimmermann, Polymerization Processes, pp. 424–467, Interscience Publishers, New York, 1977; DE-B 21 52 194) .

Further suitable polyamides are mixed aliphatic/aromatic polycondensates as are described, for example, in U.S. Pat. Nos. 2,071,250, 2,071,251, 2,130,523, 2,130,948, 2,241, 322, 2,312,966, 2,512,606 and 3,393,210 and also in Kirk-Othmer, Encyclopedia of Chemical Technology, 3rd edition, Vol. 18, pages 328 ff. and 435 ff., Wiley & Sons, 1982. Other suitable polyamides are polyether ester amides) or poly (ether amides); such products are described, for example, in DE-A 25 23 991, 27 12 987 and 30 06 961.

The polyamide molding composition can comprise either one of these polyamides or a mixture of a plurality of them. Up to 40% by weight of other thermoplastics can also be present, as long as they do not interfere with the bonding capability. Particular examples of such further thermoplastics are impact-toughening rubbers such as ethylene-propylene or ethylene-propylene-diene copolymers (EP-A-0 295 076), polypentenylene, polyoctenylene, random or block copolymers of alkenylaromatic compounds with aliphatic olefins or dienes (EP-A-0 261 748) or core/shell rubbers having a tough elastic core of (meth)acrylate, butadiene or styrene-butadiene rubber having a glass transition temperature $T_g$ of $<-10°$ C., where the core may be crosslinked and the shell may be made up of styrene and/or methyl methacrylate and/or further unsaturated monomers (DE-A 21 44 528, 37 28 685).

The polyolefin of layer III or of the bonding agent is, for example, polyethylene or polypropylene. It is in principle possible to use any commercial type. Thus, for example, possible polyolefins are: linear polyethylene of high, intermediate or low density, LDPE, isotactic or atactic homopolypropylene, random copolymers of propene with ethene and/or 1-butane, ethylene-propylene block copolymers and the like. The polyolefin can further comprise an impact-toughening component such as EPM or EPDM rubber or SEBS. Furthermore, the customary auxiliaries and additives may also be present. The polyolefin can be prepared by any known process, for example by the Ziegler-Natta process, by the Phillips process, by means of metallocenes or by a free-radical process.

The molding composition of layer III can be crosslinked as described in the prior art so as to achieve an improvement in the mechanical properties, e.g. the cold impact toughness, the heat distortion resistance or the creep behavior, or in the permeability. Crosslinking is carried out, for example, by radiation crosslinking or by means of moisture crosslinking of polyolefin molding compositions containing silane groups.

The bonding agent of layer II may further comprise, in addition to the mixture of polyamide and polyolefin, other polymers or the customary auxiliaries and additives, as long as these do not significantly impair the bonding action.

In the mixture of polyamide and polyolefin, at least part of the constituents is present in the form of a polyamide-polyolefin graft copolymer. The lower limit of this is determined by the effect according to the invention being still just achieved. It can easily be determined by simple experiments.

Polyamide-polyolefin graft copolymers can be formed by various methods, for example by reaction of suitable functional groups of the polyamide, for instance the amino or carboxyl and groups of the polyamide, with functional groups of the polyolefin either directly or with the aid of a suitable coupling reagent. Suitable functional groups are, for example, acid anhydride groups, N-acyllactam groups, carboxyl groups, epoxide groups, oxazoline groups, trialkoxysilane groups or hydroxyl groups. The functional groups can be introduced either by copolymerization of a suitable monomer together with the olefin or by a grafting reaction. In the grafting reaction, a preformed polyolefin is reacted in a known manner with an unsaturated, functional monomer and advantageously a free-radical donor at elevated temperature;

radiation crosslinking of a polyamide/polyolefin mixture by means of β-rays, x-rays or γ-rays;

reaction of a polyamide/polyolefin mixture, preferably in the melt under shear, with a free-radical donor. Suitable free-radical donors are preferably compounds having a labile C-C, N-N or O-O bond, particularly preferably peroxides, or else azo compounds.

In a first preferred embodiment of the present invention, the base molding composition of the bonding agent is prepared by reacting a) from 30 to 70 parts by volume of polyamide with b1) from 0.1 to 70 parts by volume of a polyolefin containing functional groups, and b2) from 69.9 to 0 parts by volume of an unfunctionalized polyolefin, for example in the melt under shear.

The polyolefins of the components b1) and b2) can be identical or different. For example, an ethylene-propylene rubber functionalized with maleic anhydride can be used as component b1) and an unfunctionalized isotactic homopolypropylene can be used as component b2).

In a second preferred embodiment, the base molding composition of the bonding agent is prepared by reacting a) from 30 to 70 parts by volume of polyamide with b) from 70 to 30 parts by volume of polyolefin and also from 0.05 to 10% by weight, preferably from 0.1 to 7% by weight and particularly preferably from 0.2 to 5% by weight, of a free radical donor, based on the sum of the components a) and b).

In a third preferred embodiment, the base molding composition of the bonding agent comprises a mixture of a) from 30 to 70 parts by volume of a polyamine-polyamide copolymer prepared using the following monomers:

α) from 0.5 to 25% by weight, preferably from 1 to 20% by weight and particularly preferably from 1.5 to 16% by weight, based on the polyamine-polyamide copolymer, of a polyamine having at least 4, preferably at least 8 and particularly preferably at least 11, nitrogen atoms and a number average molecular weight $M_n$ of at least 146 g/mol, preferably at least 500 g/mol and particularly preferably at least 800 g/mol, and β) polyamide-forming monomers selected from among lactams, ω-aminocarboxylic acids and/or equimolar combinations of diamine and dicarboxylic acid, and b) from 70 to 30 parts by volume of polyolefin.

In a preferred embodiment, the amino group concentration of the polyamine-polyamide copolymer is in the range from 100 to 2500 mmol/kg.

As polyamine, it is possible to use, for example, substances from the following classes:

polyvinylamines (Römpp Chemie Lexikon, 9th edition, Volume 6, page 4921, Georg Thieme Verlag, Stuttgart 1992);

polyamines which are prepared from alternating polyketones (DE-A 196 54 058);

dendrimers such as $((H_2N-(CH_2)_3)_2N-(CH_2)_3)_2-N(CH_2)_2-N((CH_2)_2-N(CH_2)_3-NH_2)_2)_2$ (DE-A-196 54 179) or tris(2-aminoethyl)amine, N,N-bis(2-aminoethyl)-N',N'-bis[2-[bis(2-aminoethyl)amino]ethyl]-1,2-ethanediamine, 3,15-bis(2-aminoethyl)-6,12-bis[2-[bis(2-amino ethyl)amino]ethyl]-9-[bis[2-bis(2-amino ethyl)amino]ethyl]amino]ethyl]-3,6,9,12,15-pentaazaheptadecane-1,17-diamine. (J. M. Warakomoki, Chem. Mat. 1992, 4, 1000–1004);

Linear polyethylenimines which can be prepared by polymerization of 4,5-dihydro-1,3-oxazoles and subsequent hydrolysis (Houben-weyl, Methoden der Organischen Chemie, Volume E20, pages 1482–1487, Georg Thieme verlag, Stuttgart, 1987);

branched polyethylenimines which are obtainable by polymerization of aziridines (Houbel-Weyl, Methoden der Organischen Chemie, Volume E20, pages 1482–1487, Georg Thieme Verlag, Stuttgart, 1987) and generally have the following amino group distribution:
from 25 to 46% of primary amino groups,
from 30 to 45% of secondary amino groups and
from 16 to 40% of tertiary amino groups.

In the preferred case, the polyamine has a number average molecular weight $M_n$ of not more than 20,000 g/mol, particularly preferably not more than 10,000 g/mol and very particularly preferably not more than 5000 g/mol.

Lactams or ω-aminocarboxylic acids used as polyamide-forming monomers contain from 4 to 19, in particular from 6 to 12, carbon atoms. Particular preference is given to using ε-caprolactam, ε-aminocaproic acid, caprylolactam, ω-aminocaprylic acid, laurolactam, ω-aminododecanoic acid and/or ω-aminoundecanoic acid.

Examples of combinations of diamine and dicarboxylic acid are hexamethylenediamine/adipic acid, hexa methylenediamine/dodecanoic acid, octamethylene-diamine/sebacic acid, decamethylenediamine/sebacic acid, decamethylenediamine/dodecanedioic acid, dodecamuthylenediamine/dodecanedioic acid and dodecamethylenediamine/2,6-naphthalenedicarboxylic acid. However, it is also possible to use all other combinations, for example decamethylenediamine/ dodecanedioic acid/terephthalic acid, hexamethylenediamine/adipic acid/terephthalic acid, hexamethylenediamine/adipic acid/caprolactam, decamethylenediamine/dodecanedioic acid/ω- aminoundecanoic acid, decamethylenediamine/dodecanedioic acid/laurolactam, decamethylenediamine/terephthalic acid/laurolactam or dodecamethylene-diamine/2,6-naphthalenedicarboxylic acid/laurolactam.

In a preferred embodiment, the polyamine-polyamide copolymer is prepared using, in addition, an oligocarboxylic acid selected from the group consisting of from 0.015 to about 3 mol % of dicarboxylic acid and from 0.01 to about 1.2 mol % of tricarboxylic acid, in each case based on the sum of the other polyamide-forming monomers. In this ratio, diamine and dicarboxylic acid in the equivalent combination of these monomers are each regarded individually. If a dicarboxylic acid is used, preference is given to adding from 0.03 to 2.2 mol %, particularly preferably from 0.05 to 1.5 mol %, very particularly preferably from 0.1 to 1 mol % and in particular from 0.15 to 0.65 mol %; if a tricarboxylic acid is used, then preference is given to adding from 0.02 to 0.9 mol %, particularly preferably from 0.025 to 0.6 mol %, very particularly preferably from 0.03 to 0.4 mol % and in particular from 0.04 to 0.25 mol %. The use of the oligocarboxylic acid significantly improves the solvent and fuel resistance, in particular the hydrolysis and alcoholysis resistance.

As oligocarboxylic acid, it is possible to use any dicarboxylic or tricarboxylic acid having from 6 to 24 carbon atoms, for example adipic acid, suberic acid, azelaic acid, sebacic acid, dodecanedioic acid, isophthalic acid, 2,6-naphthalenedicarboxylic acid, cyclohexane-1,4-dicarboxylic acid, trimesic acid and/or trimellitic acid.

In addition, aliphatic, alicyclic, aromatic, araliphatic and/or alkylaryl-substituted monocarboxylic acids having from 3 to 50 carbon atoms, e.g. lauric acid, unsaturated fatty acids, acrylic acid or benzoic acid, can, if desired, be used as regulators. These regulators enable the concentration of amino groups to be reduced without altering the molecular structure. Furthermore, functional groups such as double or triple bonds, etc., can be introduced in this way. However, it is desirable for the polyamine-polyamide copolymer to have a substantial proportion of amino groups. The amino group concentration of the copolymer is preferably in the range from 150 to 1500 mmol/kg, particularly preferably in the range from 250 to 1300 mmol/kg and very particularly preferably in the range from 300 to 1100 mmol/kg. Here and in the following, the term amino groups refers not only to terminal amino groups but also to any secondary or tertiary amine functions present in the polyamine.

In the polyamine-polyamide copolymer, the composition of the polyamide part can vary within a very wide range since the compatibility with the polyamide of the layer I is obviously determined by other factors and is generally given.

The polyamine-polyamide copolymers can be prepared by various methods.

One possibility is to combine the polyamide-forming monomers and the polyamine and then carry out the polymerization or polycondensation. The oligocarboxylic acid can be added either at the beginning or during the reaction.

However, a preferred method is a two-stage process in which lactam cleavage and the prepolymerization may firstly be carried out in the presence of water (as an alternative, the corresponding ω-aminocarboxylic acids or diamines and dicarboxylic acids are used directly and prepolymerized), after which the polyamine is added in the second step, while any oligocarboxylic acid which is also used is introduced before, during or after the prepolymerization. The reaction mixture is then depressurized at temperatures of from 200 to 290° C. and polycondensation is carried out in a stream of nitrogen or under reduced pressure.

A further preferred method is hydrolytic degradation of a polyamide to form a prepolymer and simultaneous or subsequent reaction with the polyamine. Preference is given to using polyamides in which the end group difference is approximately zero or in which any oligocarboxylic acid also used has already been incorporated by polycondensation. However, the oligocarboxylic acid can also be added at the beginning of or during the degradation reaction.

These processes make it possible to prepare ultra highly branched polyamides having acid numbers of less than 40 mmol/kg, preferably less than 20 mmol/kg and particularly preferably less than 10 mmol/kg. A reaction time of from one to five hours at temperatures of from 200° to 290° C. is sufficient to achieve almost complete conversion.

If desired, a reduced pressure phase of a number of hours can follow in a further process step. This has a duration of at least four hours preferably at least six hours and particularly preferably at least eight hours, at from 200 to 290° C. After an induction period of a number of hours, an increase in the melt viscosity is observed, which may be attributable to a reaction of amino end groups with one another taking place with elimination of ammonia and chain formation. This further increases the molecular weight, which is advantageous for extrusion compositions in particular.

If the reaction is not to be carried out to completion in the melt, the polyamine-polyamide copolymer can also be aftercondensed in the solid phase as described in the prior art.

In a fourth preferred embodiment, the base molding composition of the bonding agent is prepared by reacting
  a) from 30 to 70 parts by volume of the above-described polyamine-polyamide copolymer and
  b) from 70 to 30 parts by volume of polyolefin
with not more than 10% by weight, preferably from 0.05 to 7% by weight, particularly preferably from 0.05 to 5% by weight, in particular from 0.1 to 2% by weight and very particularly preferably from 0.2 to 1% by weight, of a free-radical donor, based on the sum of the components a) and b), for example in the melt under shear.

A fifth preferred embodiment is derived from the fourth preferred embodiment by replacing from 0.1 to 90% by weight of the polyamine-polyamide copolymer of the component a) by a conventional polyamide as described above.

A sixth preferred embodiment is derived from the first preferred embodiment by replacing from 0.1 to 100% of the polyamide of the component a) by the above-described polyamine-polyamide copolymer.

The multilayer composite of the invention may further comprise additional layers besides the layers I, II and, if desired, III, provided that these additional layers adhere to the other layers. Possible additional layers are first and foremost layers having a good barrier action in respect of fuel components, water, alcohols, glycols or gases. These layers consist, in particular, of a molding composition based on a thermoplastic polyester (e.g. polybutylene terephthalate, polyethylene 2,6-naphthalate, polybutylene 2,6-naphthalate), a fluorinated polymer (e.g. polyvinylidene fluoride, ETFE or THV), an ethylene-vinyl alcohol copolymer (EVOH) or polyoxymethylene.

The molding compositions of layers I and II may further comprise up to 50% by weight of additives selected from among impact-toughening rubber and/or customary auxiliaries and additives.

Impact-toughening rubbers for polyamide molding compositions are prior art. They contain functional groups derived from unsaturated functional compounds which are either copolymerized into the main chain or are grafted onto the main chain. Most useful is EPM or EPDM rubber onto which maleic anhydride has been grafted by a free-radical mechanism. Such rubbers can also be used together with an unfunctionalized polyolefin such as isotactic polypropylene, as described in EP-A-0 683 210.

The molding compositions may also contain relatively small amounts of auxiliaries and additives which are necessary for obtaining particular properties. Examples are plasticizers, pigments or fillers such as carbon black, titanium dioxide, zinc sulfide, silicates or carbonates, processing aids such as waxes, zinc stearate or calcium stearate, flame retardants such as magnesium hydroxide, aluminum hydroxide or melamine cyanurate, glass fibers, antioxidants, UV stabilizers and additives which give the product antielectrostatic properties or electric conductivity, e.g. carbon fibers, graphite fibrils, fibers of stainless steel or conductive carbon black.

In one possible embodiment, the molding compositions contain from 1 to 25% by weight of plasticizers, particularly preferably from 2 to 20% by weight and very particularly preferably from 3 to 15% by weight.

Plasticizers and their use in polyamides are known. A general review of plasticizers suitable for polyamides may be found in Gächter/Müller, Kunststoffadditive, C. Hanser Verlag, 2nd edition, p. 296.

Customary compounds suitable as plasticizers are, for example, esters of p-hydroxybenzoic acid having from 2 to 20 carbon atoms in the alcohol component or amides of arylsulfonic acids having from 2 to 12 carbon atoms in the amine component, preferably amides of benzenesulfonic acid.

Possible plasticizers include ethyl p-hydroxybenzoate, octyl p-hydroxybenzoate, i-hexadecyl p-hydroxybenzoate, N-n-octyltoluenesulfonamide, N-n-butylbenzenesulfonamide or N-2-ethylhexylbenzenesulfonamide.

The multilayer composite of the invention is, in one embodiment, a pipe, a filling port or a container, in particular for conveying or storing liquids or gases, for example in motor vehicles such a pipe can be straight or corrugated or have only some corrugated sections. Corrugated pipes are prior art (e.g. U.S. Pat. No. 5,460,771), so that further details are superfluous. Important applications of such multilayer composites are use as fuel lines, as tank filling ports, as vapor lines (i.e. lines in which fuel vapors are conveyed, e.g. breather pipes), as filling station pipes, as coolant lines, as pipes in air conditioning units, as lines for clutch fluid, as air brake lines or as fuel containers.

The multilayer composite of the invention can also be in the form of a flat composite, for example as a film, for instance as a packaging film for foodstuffs.

When the multilayer composite of the invention is used for conveying or storing combustible liquids, gases or dusts, e.g. fuel or fuel vapors, it is advisable to make one of the layers of the composite or an additional interior layer electrically conductive. This can be achieved by compounding with an electrically conductive additive by means of all methods of the prior art. As conductive additive, it is possible to use, for example, conductive carbon black, metal flakes, metal powder, metallized glass spheres, metallized glass fibers, metal fibers (for example of stainless steel), metallized whiskers, carbon fibers (including metallized carbon fibers), intrinsically conductive polymers, e.g. polyaniline, or graphite fibrils. Mixtures of various conductive additives can also be used.

The electrically conductive layer is preferably in direct contact with the medium to be conveyed or stored and has a surface resistance of not more than $10^9$ Ω/square, preferably not more than $10^6$ Ω/square. The method of determining the resistance of multilayer pipes is described in SAB J 2260 (November 1996, paragraph 7.9).

When the multilayer composite of the invention is configured as a hollow body or hollow profile (e.g. a pipe), this can be additionally sheathed with a further elastomer layer. Suitable sheathing materials include both crosslinking rubber compositions and thermoplastic elastomers. The sheathing can be applied to the pipe either with or without the use of an additional bonding agent, for example by extrusion via a crossflow head or by pushing a prefabricated elastomer hose over the finished, extruded multilayer pipe. Examples of suitable elastomers are chloroprene rubber, ethylene-propylene rubber (EPM), ethylene-propylene-diene rubber (EPDM), epichlorohydrin rubber (ECO), chlorinated polyethylene, acrylate rubber, chlorosulfonated polyethylene, silicone rubber, plasticized PVC, polyether ester amides or polyether amides.

The multilayer composite can be manufactured in one or more stages, for example by means of a single-stage process using multicomponent injection molding, coextrusion or coextrusion blow molding, or by means of multistage processes as described, for example, in U.S. Pat. No. 5,554,425.

To increase the bursting strength, the composite can further comprise a reinforcing textile layer as described in the prior art.

The invention also provides the molding compositions of the layer II described here. These can be used not only for the multilayer composite of the invention but also on their own for molded parts of any type.

COMPARATIVE EXAMPLE 1

50 parts by volume of polypropylene and 50 parts by volume of a PA12 having a relative solution viscosity $\eta_{rel}$ of 1.9 were mixed in the melt at 260° C. in an extruder, extruded and granulated.

Example 1

50 parts by volume of polypropylene and 50 parts by volume of a polyethylenimine-PA12 copolymer (prepared from 3% by weight of LUPASOL® G100 from BASF AG and 97% by weight of laurolactam) were mixed in the melt at 260° C. in an extruder, extruded and granulated.

Example 2

50 parts by volume of polypropylene, 50 parts by volume of the same polyethylenimine-PA12 copolymer as in example 1 and 0.5% by weight of di-tert-butyl peroxide, based on the sum of the polymer components, were mixed in the melt at 260° C. in an extruder, extruded and granulated. In all three cases, the adhesion to polypropylene and PA12 was subsequently examined. The results are summarized in the following table.

TABLE 1

| Adhesion to polypropylene (PP) and PA 12 (tape coextrusion) | | |
|---|---|---|
| | Adhesion rating PP | Adhesion rating PA12 |
| Comparative example 1 | 4 | 0 |
| Example 1 | 4 | 3 |
| Example 2 | 4 | 4 |

What is claimed is:

1. A multilayer composite, comprising:
   the following layers bound directly to one another:
   a layer I of a polyamide molding composition;
   a layer II of a bonding agent comprising at least 50% by weight of a mixture of
   a) from 30 to 70 parts by volume of i) at least 0.1 part by volume of a polyamine-polyamide copolymer or ii) a mixture of a polyamide and at least 0.1 part by volume of a polyamine-polyamide copolymer;
   wherein said polyamine-polyamide copolymer is prepared using the following monomers:
   α) from 0.1 to 25% by weight, based on the polyamine-polyamide copolymer, of a polyamine containing at least 3 nitrogen atoms, and
   β) a polyamide-forming monomer selected from the group consisting of a lactam; a ω-aminocarboxylic acid; an equimolar combination of a diamine and a dicarboxylic acid; and a mixture thereof,
   b) from 0.1 to 70 parts by volume of an olefin polymer containing a functional group,
   c) from 69.9 to 0 parts by volume of an unfunctionalized polyolefin,
   wherein the sum of the parts by volume of a), b) and c) is 100; and
   a layer III of a polyolefin molding composition.

2. The multilayer composite as claimed in claim 1, wherein component a) in layer II contains at least 0.5 part by volume of the polyamine-polyamide copolymer.

3. The multilayer composite as claimed in claim 1, wherein the polyamine-polyamide copolymer is prepared using from 0.5 to 20% by weight of the polyamine.

4. The multilayer composite as claimed in claim 1, wherein the polyamine-polyamide copolymer is prepared using from 1 to 16% by weight of the polyamine.

5. The multilayer composite as claimed in claim 1, wherein the polyamine contains at least 4 nitrogen atoms.

6. The multilayer composite as claimed in claim 1, wherein the polyamine contains at least 8 nitrogen atoms.

7. The multilayer composite as claimed in claim 1, wherein the polyamine contains at least 11 nitrogen atoms.

8. The multilayer composite as claimed in claim 1, wherein the polyamine has a number average molecular weight $M_n$ of at least 146 g/mol.

9. The multilayer composite as claimed in claim 1, wherein the polyamine has a number average molecular weight $M_n$ of at least 500 g/mol.

10. The multilayer composite as claimed in claim 1, wherein the polyamine has a number average molecular weight $M_n$ of at least 800 g/ml.

11. The multilayer composite as claimed in claim 1, wherein an amino group concentration of the polyamine-polyamide copolymer is in the range from 100 to 2500 mmol/kg.

12. The multilayer composite as claimed in claim 1, wherein the functional group of the olefin polymer is an acid anhydride group, a N-acyllactam group, a carboxylic acid group, an epoxide group, an oxazoline group, a trialkoxysilane group or a hydroxyl group.

13. The multilayer composite as claimed in claim 1, wherein one of the layers I, II or III or an additional interior layer has been made electrically conductive.

14. The multilayer composite as claimed in claim 1, which is in the form of a pipe.

15. The multilayer composite as claimed in claim 14, which is fully or partially corrugated.

16. The multilayer composite as claimed in claim 1, which is in the form of a hollow body.

17. The multilayer composite as claimed in claim 14, wherein the outermost layer is adjoined by an additional elastomer layer.

18. The multilayer composite as claimed in claim 1, which is in the form of a fuel line, a tank filling port, a vapor line, a filling station pipe, a coolant line, a pipe in an air conditioning unit, a line for clutch fluid, an air brake line, a windscreen washer pipe or a fuel container.

19. The multilayer composite as claimed in claim 1, which is in the form of a film.

20. A molding composition, comprising:
    at least 50% by weight of the following components:
    a) from 30 to 70 parts by volume of i) at least 0.1 part by volume of polyamine-polyamide copolymer or ii) a combination of a polyamide and at least 0.1 part by volume of polyamine-polyamide copolymer; wherein said polyamine-polyamide copolymer is prepared using the following monomers:
    α) from 0.1 to 25% by weight, based on the polyamine-polyamide copolymer, of a polyamine containing at least 3 nitrogen atoms, and
    β) a polyamide-forming monomer selected from the group consisting of a lactam; a ω-aminocarboxylic acid; an equimolar combination of a diamine and a dicarboxylic acid; and a mixture thereof,
    b) from 0.1 to 70 parts by volume of an olefin polymer containing a functional group,
    c) from 69.9 to 0 parts by volume of an unfunctionalized polyolefin,
    wherein the sum of the parts by volume of a), b) and c) is 100.

* * * * *